United States Patent [19]

Frierdich et al.

[11] 4,264,856

[45] Apr. 28, 1981

[54] SYSTEM FOR MAINTAINING EXCITATION OF AN ALTERNATING CURRENT GENERATOR DURING EXCESSIVE OUTPUT CURRENT CONDITIONS

[75] Inventors: Waldo J. Frierdich, Highland; Thomas F. Kappel, Belleville, both of Ill.

[73] Assignee: Basler Electric Company, Highland, Ill.

[21] Appl. No.: 22,961

[22] Filed: Mar. 23, 1979

[51] Int. Cl.³ .......................... H02P 9/00; H02H 7/06
[52] U.S. Cl. ...................................... 322/25; 322/27; 322/86; 361/20
[58] Field of Search .................. 322/17, 24, 25, 27, 322/28, 59, 86, 87; 361/20, 21

[56] References Cited

U.S. PATENT DOCUMENTS

| | | |
|---|---|---|
| 2,454,582 | 11/1948 | Thompson et al. |
| 3,314,000 | 4/1967 | Rosenberg et al. ............... 322/25 |
| 3,316,479 | 4/1967 | Frierdich . |
| 3,548,258 | 12/1970 | Ricker ............................ 322/25 X |
| 3,564,391 | 2/1971 | Dinger .............................. 322/25 |
| 3,619,761 | 11/1971 | Nagae et al. ..................... 322/25 |
| 3,634,750 | 1/1972 | Bobo ............................... 322/28 X |
| 3,899,731 | 8/1975 | Smith .............................. 322/28 X |

Primary Examiner—Robert J. Hickey
Attorney, Agent, or Firm—Senniger, Powers, Leavitt and Roedel

[57] ABSTRACT

In a generating system having a shunt-type regulator for exciting the field of a generator during normal operating conditions, circuitry is provided for supplying voltage to a field winding to maintain excitation of the generator during excessive output current conditions. This circuitry senses the low voltage indicative of a fault or overload condition and in response boosts the field of the field winding during such an excessive output current condition an amount sufficient to maintain generator excitation during that particular condition. It does this by impressing a voltage, supplemental to that supplied by the regulator, upon the field winding during the condition. As a result the excitation of the generator is maintained.

14 Claims, 3 Drawing Figures

SYSTEM FOR MAINTAINING EXCITATION OF AN ALTERNATING CURRENT GENERATOR DURING EXCESSIVE OUTPUT CURRENT CONDITIONS

BACKGROUND OF THE INVENTION

This invention relates to apparatus for maintaining excitation during excessive output current conditions, i.e. during overload and/or fault conditions, of a generator whose field winding is normally supplied with power from a shunt-type regulator.

The voltage and current for the field winding of an alternating current generator are often supplied from a shunt-type regulator, i.e. from a regulator that receives its power from the generator itself. This power from the regulator is supplied either directly to the generator's field winding or to the field winding of an exciter. In the latter case the output of the exciter is in turn supplied to the generator's field winding.

Generator systems which use shunt regulators are quite satisfactory during normal operating conditions, but they do have some problems during fault or overload conditions. When a fault or overload occurs, the current in one or more of the generator's output lines increases and the voltage, which is also supplied to the regulator, falls. As a result the output of the regulator decreases, causing a decrease in the strength of the field winding's field which further reduces the output voltage of the generator. This feedback can quickly lead to a complete collapse of the generator's field and an accompanying loss of generator output. In some instances, the collapse occurs before breakers or other protective devices near the fault can clear it.

Compounding this problem of generator systems that use shunt-type regulators is the fact that different fault or overload conditions require different field winding voltages to maintain generator excitation. For example, in the case of a three-phase generator, three different voltages are required to maintain excitation during a line-to-neutral short, a line-to-line short, and a three-phase short, respectively. Although impressing the largest of these voltages upon the field winding during any of the faults will maintain excitation of the generator during all three fault conditions, it also results in excessive short circuit current flowing in the output lines in all fault conditions except the three-phase short, until the breakers clear the lines.

Prior art generator systems with shunt-type regulators are shown in U.S. Pat. Nos. 2,454,582 and 3,316,499.

SUMMARY OF THE INVENTION

Among the several objects of the present invention may be noted the provision of a system for maintaining the excitation of an alternating current generator during excessive output current conditions; the provision of such a system which provides the field strength required for the particular excessive output current condition occurring; the provision of such a system which gives protective devices sufficient time to clear a fault; the provision of such a system which supplies one voltage to the field winding for a line-to-neutral short, a second for a line-to-line short, and a third for a three-phase short; and the provision of such a system which senses excessive output current conditions and in response boosts the field of the field winding an amount determined by the number of output lines in which excessive output current is flowing. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
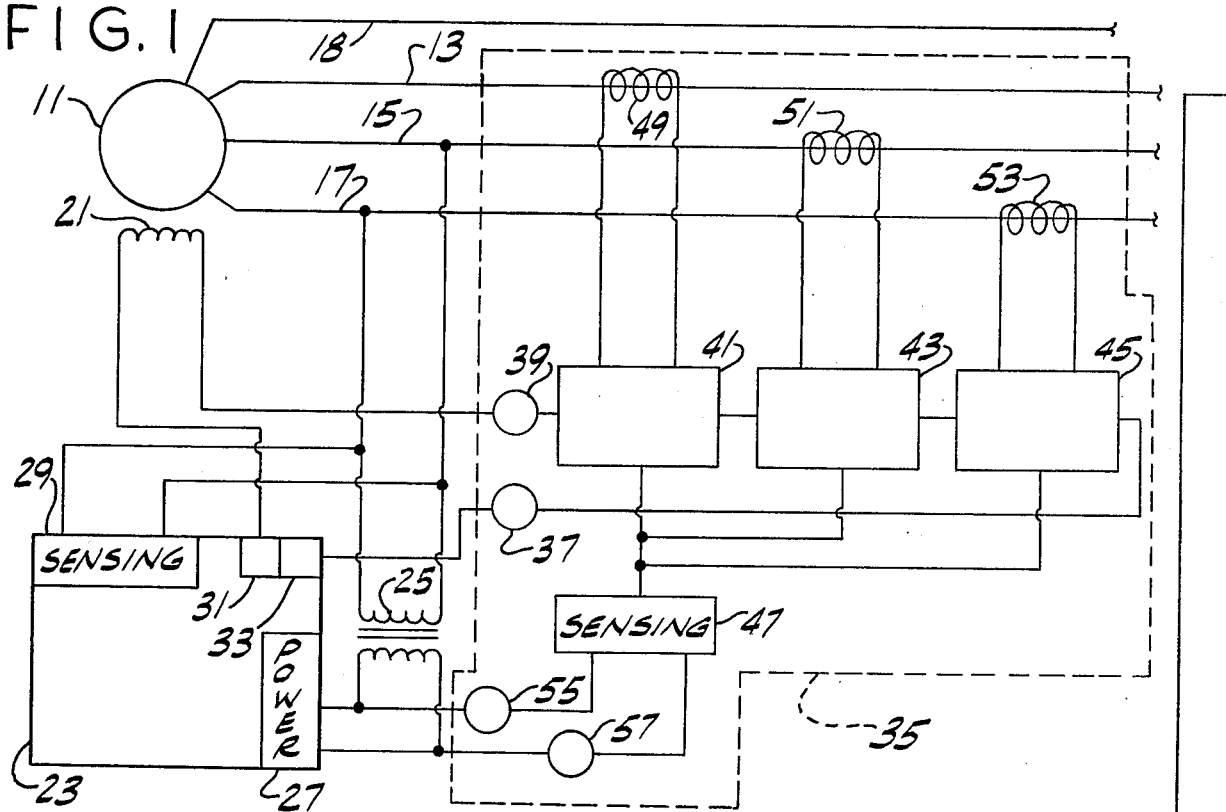
FIG. 1 is a schematic block diagram showing a generator system with a conventional shunt-type regulator connected to the excitation maintaining system of the present invention.

Referring now to the drawings, there is shown in FIG. 1 a conventional alternating current generator 11 for supplying three-phase power over three output lines 13, 15 and 17 to a load or loads not shown. Line 13 carries the A phase output, line 15 the B phase output, and line 17 the C phase output. Generator 11 also has a neutral conductor 18 although the present invention is not limited to use with generators having a neutral conductor. The generator includes a field winding 21 which during normal operating conditions receives substantially all its power from a conventional regulator 23. Alternatively, an exciter (not shown) with its own field winding may be interposed between the regulator and field winding 21. Power from lines 15 and 17 is supplied, via a transformer 25, to the power terminals of regulator 23, indicated at 27. Lines 15 and 17 are also connected to the sensing terminals, indicated at 29, of the regulator. Regulator 23 further includes a positive terminal 31 and a negative terminal 33. The details of regulator 23 are well known and not part of this invention. Accordingly, the actual circuitry making up the regulator is not shown.

Conventionally, field winding 21 is connected directly across terminals 31 and 33. In the present invention, however, only terminal 31 is directly connected to the field winding. Terminal 33, and the other side of field winding 21, are instead connected to the excitation maintaining system of the present invention, which is indicated generally at 35. Specifically, terminal 33 is connected to a terminal 37, and the other side of field winding 21 is connected to a terminal 39 of system 35. Disposed in series between terminals 37 and 39 are three booster modules or stages 41, 43 and 45. Although this series connection is preferred, as an alternative the stages can be connected in parallel. System 35 further includes a sensing unit 47 and three current transformers 49, 51 and 53. Unit 47 is connected via two terminals 55 and 57 to the power input terminals of regulator 23. Alternatively, terminals 55 and 57 can be connected directly to output lines 15 and 17, or indeed to any two output lines of the generator. It is also within the skill of one in the art to sense the voltages in all three output lines if desired. All such ways of sensing the voltages in the output lines are included within the present invention. The current transformers, on the other hand, are coupled to output lines 13, 15 and 17 and supply current to booster stages 41, 43 and 45, respectively.

Sensing unit 47 constitutes both means for sensing excessive output current conditions and means for controlling booster stages 41, 43 and 45. During a fault or an overload, the voltage present at the regulator's power input terminals falls. Sensing unit 47 detects this, and when that voltage falls to a predetermined level it signals that fact to booster stages 41, 43 and 45. These stages, together with their associated current transformers, constitute means responsive to sensing unit 47 for boosting the field of the field winding an amount corresponding to the particular condition occurring. They do this by impressing a voltage upon the field winding that is sufficient to maintain generator excitation under that particular condition. Unit 47 controls stages 41, 43 and 45 to impress this voltage on the field winding only during excessive output current conditions. In the absence of a signal from unit 47, stages 41, 43 and 45 do not impress any substantial voltage upon field winding 21. When a signal indicating an excessive output current condition is received by the stages, however, they do impress the appropriate voltage upon the field winding.

The voltage supplied by stages 41, 43 and 45 to field winding 21 is supplemental to that supplied by the regulator in that the total voltage impressed upon the winding during fault or overload conditions is the sum of the voltages from these three stages and the voltage from the regulator, since the stages, winding and regulator are in series. As a practical matter, however, most of the voltage is supplied by the stages, since the output of regulator 23 decreases rapidly during excessive output current conditions. The voltage impressed upon the field winding by stages 41, 43 and 45 is a function of the particular overload or fault condition occurring because each stage develops its voltage independently of the other two. When excessive output current is flowing in only one output line, as during a line-to-neutral short, only the stage associated with that line develops any substantial voltage. When excessive output current is flowing in two lines, as during a line-to-line short, the two stages associated with those lines each develop a respective voltage but the third stage does not. And when excessive output current is flowing in all three lines, as during a three-phase short, each of the three stages develop respective voltages. Since the stages are substantially identical and in series, the total voltage developed by stages 41, 43 and 45 when only one line has excessive current flowing therein is one-third the maximum voltage they can develop; it is two-thirds maximum when excessive output current is flowing in two output lines; and it is the maximum when excessive current is flowing in all three lines. The voltages necessary to maintain the generator's field under these same three conditions are approximately in the ratio of 1:2:3, so stages 41, 43 and 45 develop substantially the voltages needed to maintain excitation of the generator during any particular excessive output current condition. Put another way, these stages plus current transformers 49, 51 and 53 constitute means for impressing a predetermined voltage upon field winding 21 when an excessive output current is flowing in only a single output line, for impressing twice the predetermined voltage upon the field winding when an excessive output current is flowing in two lines, and for impressing three times the predetermined voltage upon the field winding when an excessive output current is flowing in all three output lines.

Figure 2:
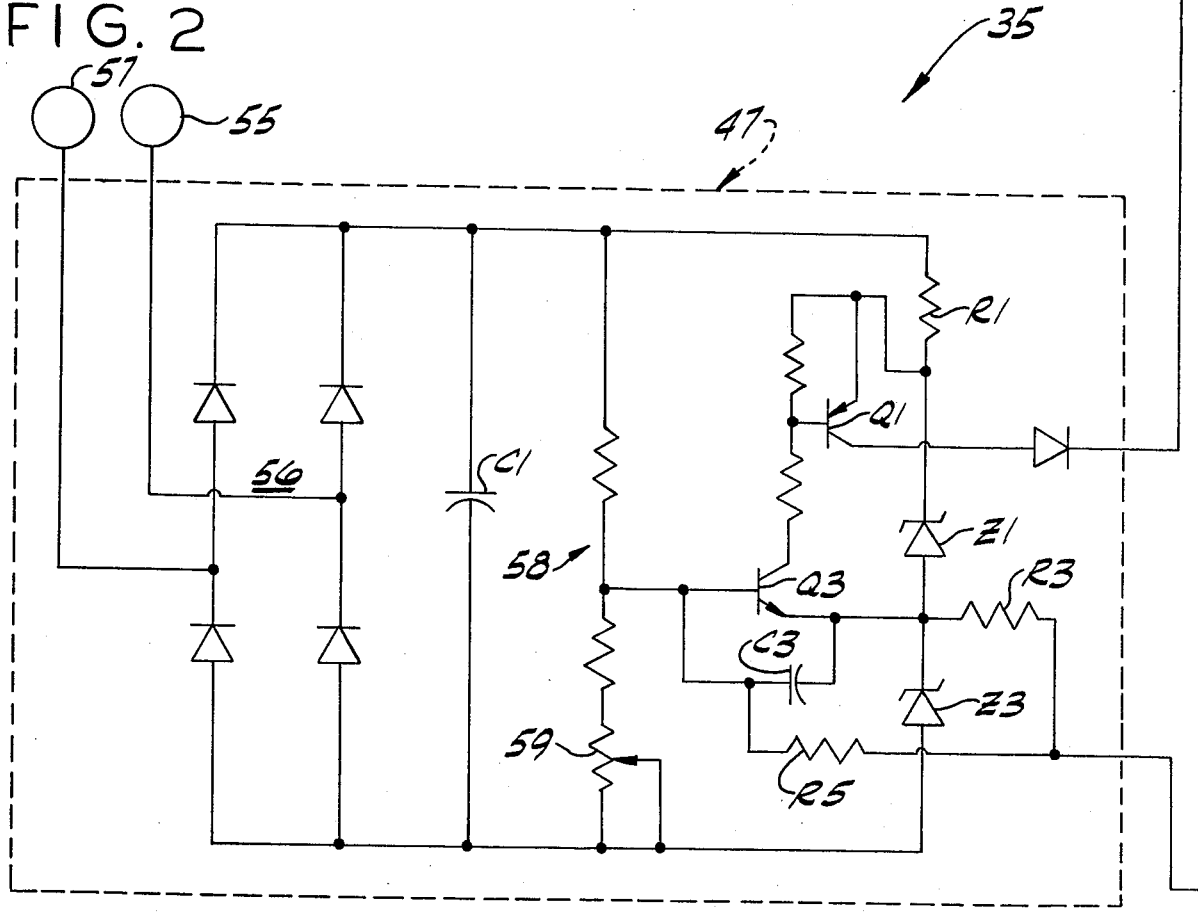
FIGS. 2 and 2A are schematic circuit diagrams of the excitation maintaining system of the present invention.
Figure 2A:
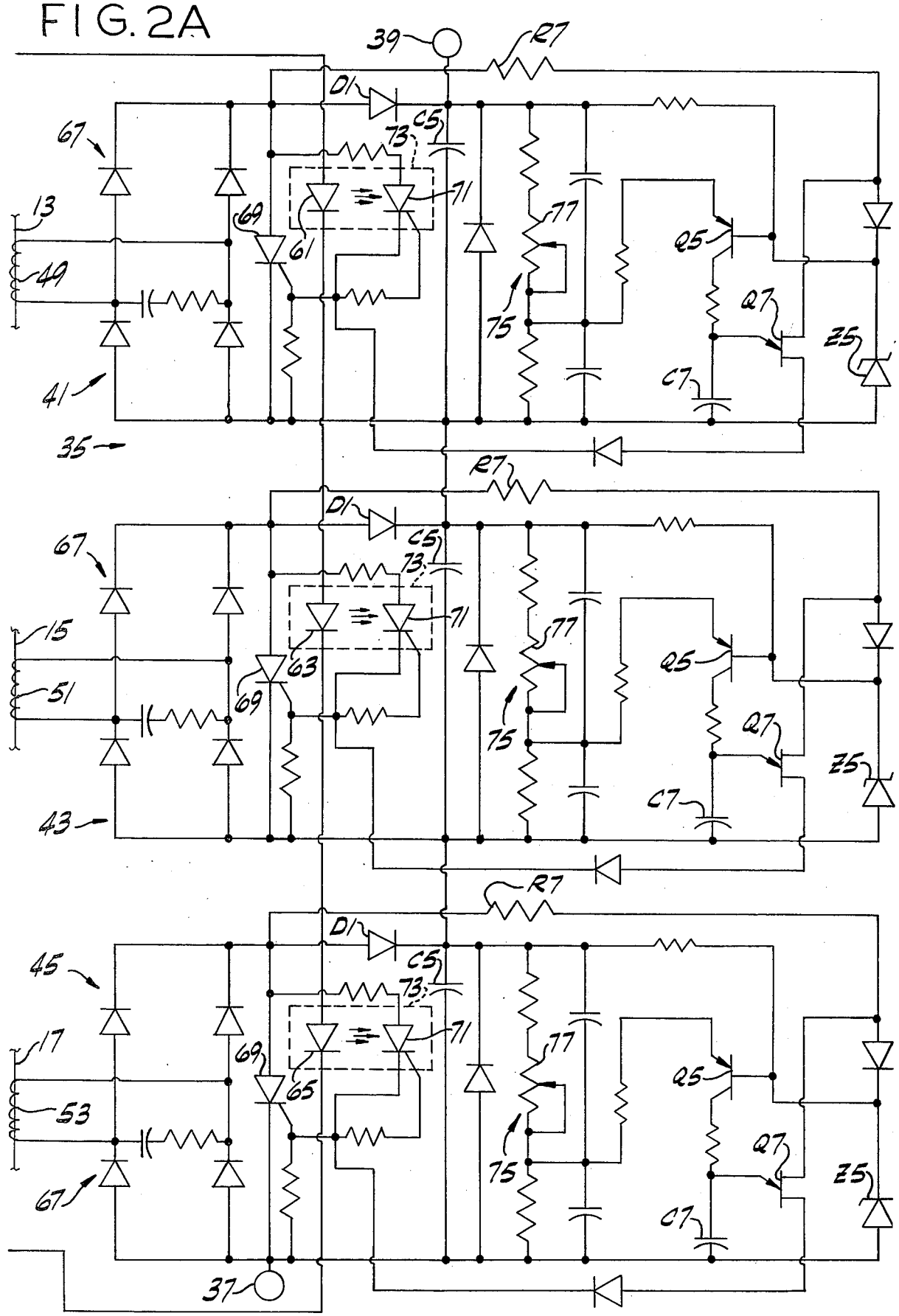

The circuitry of system 35 is shown in detail in FIGS. 2 and 2A. For the most part, sensing unit 47 is shown on FIG. 2 and the booster stages and their associated current transformers are shown on FIG. 2A.

Referring first to FIG. 2, sensing unit 47 includes a diode bridge rectifier 56; a capacitor C1 connected across the diode bridge; a voltage divider 58 also connected across the diode bridge and including a potentiometer 59; a resistor R1 and two zener diodes Z1 and Z3 connected across the diode bridge; a PNP transistor Q1 with its emitter connected between resistor R1 and zener diode Z1; an NPN transistor Q3 with its base connected to voltage divider 58, its collector connected through a resistor to the base of transistor Q1, and its emitter connected between zener diodes Z1 and Z3; a capacitor C3 connected between the base and emitter of transistor Q3; and three light-emitting diodes (LEDs) 61, 63 and 65 (see FIG. 2A) connected in series between the collector of transistor Q1 and two resistors R3 and R5. Resistor R3 is in turn connected between zener diodes Z1 and Z3 while resistor R5 is connected to voltage divider 58.

Turning now to FIG. 2A, booster stages 41, 43 and 45 are shown connected to their respective current transformers. The stages are identical and include a diode bridge rectifier 67 to which current from the associated current transformer is applied, a power silicon controlled rectifier (SCR) 69 connected directly across its respective stage and the diode bridge, and a photosilicon controlled rectifier (photo-SCR) 71 whose cathode is connected to the gate of SCR 69. Photo-SCRs 71 are each associated with one of LEDs 61, 63 and 65 to form an optocoupler 73, indicated by the dashed lines, in each stage. Each stage further includes a large capacitor C5 connected across that stage to develop a voltage from the rectified current-transformer current, capacitors C5 being connected in series with each other across terminals 37 and 39; a diode D1 to prevent the discharge of capacitor C5 when SCR 69 conducts; a voltage divider 75 including a potentiometer 77 for setting the maximum voltage which each stage can develop; a PNP transistor Q5 having its emitter connected through a resistor to voltage divider 75; a zener diode Z5 connected between the base of transistor Q5 and the low side of bridge 67; and a unijunction transistor Q7 which has one base connected through a resistor R7 to the high side of diode bridge 67, the other base connected through a diode to the gate of SCR 69, and its emitter connected directly to a capacitor C7 and indirectly, through a resistor, to the collector of transistor Q5.

For purposes of illustration, in the following description of the operation of the present invention generator 11 is described as a 120 V three-phase generator. The present invention is not limited to use with such a generator, however, but rather is of wide applicability.

During normal operating conditions, the voltage present at the power input terminals of regulator 23, and therefore across terminals 55 and 57 of sensing unit 47 is about 120 VAC. This voltage is rectified by bridge 56, filtered by capacitor C1 and impressed across voltage divider 58 as well as across the series circuit consisting of resistor R1 and zener diodes Z1 and Z3. Under these conditions, transistors Q1 and Q3 both conduct, causing collector current from transistor Q1 to flow through LEDs 61, 63 and 65 (see FIG. 2A), thereby gating photo-SCRs 71 on. They in turn gate on SCRs 69. When each SCR 69 conducts, it shorts its associated diode bridge 67 causing the output voltage of each module or stage, i.e., the voltage across each capacitor C5, to decay substantially to zero and to remain there. Of course, other devices, e.g., transistors or triacs, can equivalently be used to short bridges 67. As a result of the shorting of bridges 67, booster stages 41, 43 and 45 add no substantial voltage to that supplied by regulator 23.

During a fault or overload, on the other hand, the voltage present across terminals 55 and 57 drops well below 120 VAC. When this voltage drops to a predetermined level, e.g., 80 V, which is set by means of potentiometer 59, transistor Q3 stops conducting. The voltage on the base of transistor Q1 thereupon rises, and it too stops conducting, thereby cutting off the current through LEDs 61, 63 and 65. Photo-SCRs 71 no longer conduct, in the absence of the radiation from LEDs 61, 63 and 65, and this removes the gating signal from SCRs 69. Each SCR 69 thereafter continues to conduct only until the end of the next half cycle of current from its associated bridge. As that current approaches zero, the SCR turns off. Since the gating signals are now removed, none of the SCRs conduct as the current increases during the next half cycle. As a result the bridges are no longer shorted out and current from the current transformers flows through diodes D1 to build up a voltage across capacitors C5. Thus, booster stages 41, 43 and 45 are responsive to the sensing means to develop a supplemental voltage only during excessive output current conditions. A substantial current flow occurs only in those stages whose associated output line has an excessive output current flowing therein. In those stages, the voltage across the capacitor, and hence across the stage, quickly rises. In some instances transient currents of up to 1000% of normal line current may occur for several cycles after a generator is suddenly short circuited. This quickly builds the voltage across capacitor C5 up to a maximum. These high currents do not damage bridge 67 or SCR 69, however. Capacitor C5 is of such a value, e.g., 1000 μF, that it protects the bridge and SCR from adverse effects of such high currents. That is, each capacitor C5 constitutes means for protecting its respective stage from damage during the flow of transient currents following the occurrence of a sudden short circuit. The maximum voltage across capacitor C5 is set by means of potentiometer 77. In the case of a 120 V generator, this maximum voltage is around 30 V. This value is chosen to provide approximately 300–400% of normal line current into a shorted line so as to permit the protective device associated with that line to clear the fault. Thirty volts, impressed upon the field winding of a 120 V generator, will maintain the excitation of the generator to permit it to supply approximately 300–400% of normal line current to a shorted line. Likewise 60 V, when impressed upon field winding 21 will maintain excitation of the generator while it supplies approximately 300–400% of normal line current to two shorted lines; and 90 V will maintain the excitation of a 120 V generator during a three-phase short.

The total voltage developed by the booster stages appears across terminals 37 and 39. Since the booster stages are in series, this total voltage is the sum of the voltages across capacitors C5. The booster stages constitute means for developing a voltage from current in at least one of the lines sufficient to maintain excitation of the generator during an excessive output current condition and for impressing said voltage upon the field winding. When excessive current is flowing in only one line, the total voltage is 30 V; when excessive current is flowing in two lines, the total voltage is 60 V; and when excessive current is flowing in all three lines, the total voltage is 90 V. As one can readily see, these voltages are substantially those needed to maintain excitation of generator 11 during those particular conditions. That is, booster stages 41, 43 and 45 develop the voltage needed, and only the voltage needed, to maintain excitation of the generator during the particular condition occurring. Ninety volts, for instance, are not impressed upon the field winding during a line-to-line short; only 60 V are.

In each stage, voltage divider 75, transistors Q5 and Q7, and zener diode Z5 constitute means for regulating the maximum voltage developed by that stage during excessive output current conditions in its associated output line. They limit the maximum voltage to around 30 V as follows: The base of transistor Q5 cannot exceed the breakdown voltage of zener diode Z5. Whenever the voltage on its emitter, which is determined by the voltage across capacitor C5 and the setting of potentiometer 77, exceeds the breakdown voltage, transistor Q5 conducts. Potentiometer 77 is set so that this occurs near when the voltage across capacitor C5 is about 30 V. When transistor Q5 conducts it charges capacitor C7 and thereby impresses an increasing voltage upon the emitter of unijunction transistor Q7. The maximum voltage on the upper base of transistor Q7 is limited to slightly more than the breakdown voltage of zener diode Z5, and this voltage is impressed upon that base every half cycle at the same time the maximum voltage out of diode bridge 67 is impressed across SCR 69. When the voltage on the emitter of transistor Q7 reaches roughly 70% of the voltage on the upper base, transistor Q7 conducts, discharging capacitor C7. Since the lower base of transistor Q7 is connected to the gate of SCR 69, the conducting of transistor Q7 causes that SCR to conduct. The SCR continues conducting for the remainder of the half cycle. This shorts the diode bridge and allows the voltage across capacitor C5 to decay as it supplies energy to the generator field. As the current from the bridge falls to zero at the end of the half cycle, SCR 69 stops conducting again, thereby eliminating the short across the diode bridge as before. This process repeats for each subsequent half cycle of the current. Capacitor C5 charges up during each half cycle until the predetermined voltage is reached, at which point SCR 69 conducts, shorting the diode bridge and allowing the voltage across capacitor C5 to decay somewhat. Thus, during each half cycle when capacitor C5 reaches the proper voltage, transistor Q7 gates SCR 69 to prevent further charging of the capacitor. Since each stage regulates its maximum voltage in precisely the same way, the total voltage of stages 41, 43 and 45 is limited to 30 V, 60 V or 90 V, depending upon the number of lines in which excessive current is flowing.

On occasion, after the voltage from the booster stages is impressed upon field winding 21, the generator output voltage increases to above the level at which the sensing unit originally signalled an excessive output current condition. If the sensing unit turned off as the voltage increases at the same level at which it turned on as the voltage decreases, it would at that point turn off the booster stages by relighting LEDs 61, 63 and 65. This, of course, is undesirable. Sensing unit 47 has hysteresis or a differential built in to prevent such symmetrical behavior. Capacitor C3 and resistor R5 ensure that the voltage at which the LEDs turn back on significantly, e.g., by 5 V, exceeds the voltage at which they were originally turned off. That is, they constitute means for producing a differential in the response of sensing unit 47 to rising and falling voltage levels.

The present invention has applications not readily apparent. Not only does it prevent collapse of the generator's field during ordinary overloads and fault conditions, but also it is very useful in dealing with temorary overloads such as occur during the starting of a large electric motor. The starting current of such a motor far exceeds its operating current, and therefore such a motor puts quite a burden on smaller generators. With the system of the present invention, however, the predetermined voltage at which the sensing unit enables the booster stages is set at a relatively high level, e.g., at 100 V, and when the output voltage of the generator drops to that level, booster stages 41, 43 and 45 impress their voltages upon the field winding. This causes a quick boost in the current available from generator 11, thereby facilitating the starting of such motors.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for supplying voltage to a field winding to maintain excitation of an alternating current generator during excessive output current conditions, said generator having a plurality of output lines for supplying power to a load, the voltage and current for the field winding being supplied during normal operating conditions by a shunt type regulator, said system comprising: means for sensing excessive output current conditions; and means, responsive to the sensing means, for boosting the field of the field winding during an excessive output current condition by impressing a voltage sufficient to maintain excitation of the generator during said condition upon the field winding during said condition, said boosting means including means for impressing a first voltage upon the field winding when one of the generator's output lines has an excessive output current flowing therein, said first voltage having a magnitude sufficient to maintain excitation of the generator when excessive output current flows in one of said output lines and means for impressing a second voltage upon the field winding when excessive output current is flowing in two of the generator's output lines, said second voltage having a magnitude sufficient to maintain excitation of the generator when excessive output current flows in two of said output lines, said voltage being supplemental to that supplied by the regulator, thereby maintaining excitation of the generator.

2. A system as set forth in claim 1 wherein the generator is a three-phase generator having three output lines and wherein the boosting means includes means for impressing a third voltage upon the field winding when excessive output current flows in all three lines, said third voltage having a magnitude sufficient to maintain excitation of the generator when excessive output current flows in all three output lines.

3. A system for supplying voltage to a field winding to maintain excitation of an alternating current generator during excessive output current conditions, said generator having a plurality of output lines for supplying power to a load, the voltage and current for the field winding being supplied during normal operating conditions by a shunt type regulator, said system comprising: means for sensing excessive output current conditions; and means, responsive to the sensing means, for boosting the field of the field winding during an excessive output current condition by impressing a voltage sufficient to maintain excitation of the generator during said condition upon the field winding during said condition, said boosting means including a plurality of stages, there being one stage for and associated with each output line of the generator, each stage including means for developing a voltage from the current in its associated output line, said stages being in series with each other, the voltage impressed on the field winding by the boosting means being the sum of the voltages developed by said stages, said voltage being supplemental to that supplied by the regulator, thereby maintaining excitation of the generator.

4. A system as set forth in claim 3 wherein said sensing means includes means for controlling the stages to develop their respective voltages only during excessive output current conditions, said supplemental voltage being substantially zero in the absence of an excessive output current condition.

5. A system as set forth in claim 3 wherein each stage includes means for regulating the maximum voltage developed by that stage during excessive output current conditions in its associated output line.

6. A system as set forth in claim 3 wherein the boosting means further includes a plurality of current transformers, there being one transformer for and associated with each output line and stage, each transformer being coupled to its associated output line and being connected to its associated stage for supplying current thereto.

7. A system as set forth in claim 3 wherein the stages are connected in series between the regulator and one side of the field winding, whereby the voltage impressed upon the field winding is the sum of the voltages developed by said stages and the voltage developed by said regulator.

8. A system as set forth in claim 3 wherein each stage includes means for protecting said stage from damage during the flow of transient currents following the occurrence of a sudden short circuit.

9. A system for supplying voltage to a field winding to maintain excitation of an alternating current generator during excessive output current conditions, said generator having at least three output lines for supplying power to a load, the voltage and current for the field winding being supplied during normal operating conditions by a shunt type regulator, said system comprising: means for sensing excessive output current conditions; and means, responsive to the sensing means, for boosting the field of the field winding during an excessive output current condition by impressing a voltage sufficient to maintain excitation of the generator during said condition upon the field winding during said condition, the boosting means including means for impressing a predetermined voltage upon the field winding when an excessive output current flows in only a single output line, for impressing twice the predetermined voltage upon the field winding when an excessive output current flows in two output lines, and for impressing three times the predetermined voltage upon the field winding when an excessive output current flows in three output lines, said voltages being supplemental to that supplied by the regulator, thereby maintaining excitation of the generator.

10. A system as set forth in claim 1 wherein the regulator includes power input terminals, said sensing means being connected to said terminals and including means for detecting voltages at said terminals indicative of an excessive current condition, said sensing means being responsive to a voltage indicative of an excessive current condition to control the boosting means to impress a supplemental voltage upon the field winding.

11. A system as set forth in claim 10 wherein the sensing means includes means for producing a differential in its response to rising and falling voltage levels, whereby the sensing means controls the boosting means to impress a supplemental voltage upon the field winding from the time the voltage at the regulator's power input terminals falls to a first predetermined level until said voltage at said terminals rises to a second, higher predetermined level.

12. A system for supplying voltage to a field winding to maintain excitation of an alternating current generator during excessive output current conditions, said generator having a plurality of output lines for supplying power to a load, the voltage and current for the field winding being supplied during normal operating conditions by a shunt type regulator, said system comprising: means for sensing excessive output current conditions; and means in series between said regulator and one side of said field winding for developing a voltage from current in at least one of said lines sufficient to maintain excitation of the generator during excessive output current conditions and for boosting the field of the field winding during said conditions by impressing said voltage upon the field winding, said voltage developing and boosting means being responsive to the sensing means to develop said voltage only during excessive output current conditions, said voltage being supplemental to that supplied by the regulator, thereby maintaining the excitation of the generator.

13. A system as set forth in claim 15 wherein said boosting means including means for regulating the magnitude of the supplemental voltage impressed upon the field winding.

14. A system as set forth in claim 12 wherein the boosting means includes a plurality of stages, there being one stage for and associated with each output line of the generator, each stage including means for developing a voltage from the current in its associated output line, and wherein the boosting means further includes means for regulating the maximum voltage developed by each stage during excessive output current conditions in its associated output line.

* * * * *